United States Patent
Vaidyanathan et al.

(10) Patent No.: US 8,925,079 B2
(45) Date of Patent: Dec. 30, 2014

(54) METHOD, APPARATUS AND PROGRAM FOR DETECTING SPOOFED NETWORK TRAFFIC

(75) Inventors: Ravichander Vaidyanathan, Belle Mead, NJ (US); Abhrajit Ghosh, Edison, NJ (US); Aditya Naidu, Edison, NJ (US); Akira Yamada, Tokyo (JP); Ayumu Kubota, Saitama (JP); Yukiko Sawaya, Fujimi (JP); Yutaka Miyake, Saitama (JP)

(73) Assignees: Telcordia Technologies, Inc., Piscataway, NJ (US); KDDI Corporation, Tokyo (JP)

( * ) Notice: Subject to any disclaimer, the term of this patent is extended or adjusted under 35 U.S.C. 154(b) by 162 days.

(21) Appl. No.: 13/295,553

(22) Filed: Nov. 14, 2011

(65) Prior Publication Data
US 2013/0125235 A1 May 16, 2013

(51) Int. Cl.
| | | |
|---|---|---|
| *G06F 11/00* | (2006.01) |
| *G06F 12/14* | (2006.01) |
| *G06F 12/16* | (2006.01) |
| *G08B 23/00* | (2006.01) |
| *G06F 15/173* | (2006.01) |

(52) U.S. Cl.
USPC ............... 726/23; 726/22; 709/224; 709/225

(58) Field of Classification Search
USPC .............................. 726/22–23; 709/223–225
See application file for complete search history.

(56) References Cited

U.S. PATENT DOCUMENTS

| 7,823,202 | B1* | 10/2010 | Nucci et al. ................... 726/22 |
|---|---|---|---|
| 8,059,551 | B2* | 11/2011 | Milliken ....................... 370/252 |
| 2002/0101821 | A1* | 8/2002 | Feldmann et al. ............ 370/232 |
| 2002/0103631 | A1* | 8/2002 | Feldmann et al. ............. 703/22 |
| 2004/0250123 | A1 | 12/2004 | Robert et al. |
| 2006/0184690 | A1* | 8/2006 | Milliken ....................... 709/238 |
| 2007/0030855 | A1* | 2/2007 | Ribiere et al. ............... 370/401 |
| 2007/0250642 | A1* | 10/2007 | Thubert et al. ............... 709/245 |
| 2010/0313264 | A1* | 12/2010 | Xie et al. ....................... 726/22 |
| 2011/0196961 | A1* | 8/2011 | Wang et al. ................... 709/224 |
| 2011/0219443 | A1 | 9/2011 | Hampel et al. |
| 2011/0271340 | A1* | 11/2011 | Vaidyanathan et al. ........ 726/22 |

OTHER PUBLICATIONS

International Application No. PCT/US2009/055958—PCT International Search Report dated Aug. 2, 2012.

(Continued)

*Primary Examiner* — Tae Kim

(57) ABSTRACT

A method, an apparatus and a program for detecting spoofed Internet Protocol (IP) traffic directed to a network having a plurality of autonomous systems (AS) is provided. The method comprises receiving an incoming packet through an AS, the incoming packet containing a source IP address and a destination IP address, acquiring a corresponding source and destination IP address prefixes, converting the corresponding source and destination IP address prefixes into a source AS number and a destination AS number, determining if the incoming packet arrived from an unexpected source based upon the corresponding destination IP address prefix and the converted source and destination AS number using an unexpected pair tuple table generated from network routing information and generating an alert indicating that the incoming packet is not allowed to enter the network.

12 Claims, 6 Drawing Sheets

(56) References Cited

OTHER PUBLICATIONS

"Consenseus Roadmap for Defeating Distributed Denial of Service Attacks", Version 1.10. CERT/CC at Carnegie Mellon University (Rich Pethia), The SANS Institute (Alan Paller), and The Center for Education and Research in Information Assurance and Security (CERIAS) at Purdue University (Gene Spafford), http://www.sans.org/dosstep.roadmap.php.

"Worldwide Infrastructure Security Report", Oct. 2008. Arbor Networks, http://www.arbornetworks.com/report.

G.R. Malan, "Observations and Experiences Tracking Denial-Of-Service Attacks Across a Regional ISP", Arbor Networks /University of Michigan, http://www.arbornetworks.com/index.php?option=com_docman&task=doc_download&gid=97.

Team CYMRU Research, "What is a Bogon and Why Should I Filter It?", http://www.team-cymru.org/Services/Bogons/.

C. Brenton, "Egress Filtering FAQ", SANS Institute InfoSec Reading Room, http://www.sans.org/reading_room/whitepapers/firewalls/egress_filtering_faq_1059?show=1059.php&cat=firewalls.

B. R. Greene and N. Jarvis, "Unicast Reverse Path Forwarding (uRPF) Enhancements for the ISP-ISP Edge", Cisco Systems, Feb. 2001, ftp://ftp-eng.cisco.com/cons/isp/security/URPF-ISP.pdf.

S. Templeton and K. Levitt, "Detecting Spoofed Packets", Proceedings of the Third DARPA Information Survivability Conference and Exposition (DISCEX III), Washington D.C, Apr. 2003.

T. Peng, C. Leckie, R. Kotagiri, "Protection from Distributed Denial of Service Attack Using History-based IP Filtering", IEEE International Conference on Communications (ICC 2003), Anchorage, Alaska, USA, May 2003.

A. Ghosh, L. Wong, G. DiCrescenzo, R. Talpade, "InFilter: Predictive Ingress Filtering to Detect Spoofed IP Traffic", Proceedings of the Second International Workshop on Security in Distributed Computing Systems (SDCS) (ICDCSW'05) vol. 2, 2005.

\* cited by examiner

METHOD, APPARATUS AND PROGRAM FOR DETECTING SPOOFED NETWORK TRAFFIC

FIELD OF THE INVENTION

The present application relates generally to detecting spoofed IP (Internet Protocol) traffic when it enters an ISP (Internet Service Provider) network, and particularly to a method, an apparatus and a program for detecting packets with spoofed source IP addresses by combining AS (Autonomous System) membership information with network connectivity information.

BACKGROUND

Spoofed IP traffic (traffic containing packets with incorrect source IP addresses) is often used by Internet-based attackers for anonymity, to reduce the risk of trace-back and to avoid attack detection by network-based sensors. Attackers often spoof or disguise the identity of machines that are used to carry out an attack by falsifying the source address of the network communication. This makes it more difficult to detect and identify the sources of attack traffic and sometimes shifts attention away from the attackers and toward innocent third parties.

It is common for a skillful attacker to use an incorrect source IP address in attack traffic emanating from most widely used operating systems. Since IP routing is destination-based, spoofed IP packets are delivered to the intended target in the same way as non-spoofed IP packets. Spoofed IP packets are particularly prevalent in DDoS (Distributed Denial of Service) attacks, wherein an attacker can compel multiple intermediate compromised hosts to inundate a target host or network with a cumulatively high-volume IP traffic stream. Detection of such DDoS attacks by network-based sensors is difficult since spoofing ensures that traffic volume from individual hosts appears to be low.

In addition to high-volume attacks such as DDoS, relatively stealthy attacks may also employ spoofed IP packets. A notable example is the Slammer worm which sends out a single source IP spoofed UDP (User Datagram Protocol) packet that compromises the destination node. Thus, Spoofed IP traffic detection is a generic means by which to detect several different types of network attacks without using specialized detectors for each attack.

U.S. application Ser. No. 12/769,696 filed on Apr. 29, 2010 which is assigned to Telcordia, Technologies, Inc. et al. describes an apparatus and a method for detecting spoofed traffic using a training period where packets are examined for expected sources. An expected source table is constructed by examining historical traffic traces associated with a particular network interface. Source IP addresses in IP packets are correlated with origin AS information by leveraging BGP (Border Gateway Protocol) routing information or routing registries. If a packet with an origin AS "a" is observed at an interface "I", AS "a" is added to the EAS number table set for interface "I".

However, no inferences about source IP addresses (prefixes) that were not observed at the time the historical data was collected can be made.

Therefore, there is a need for a reliable and effective method and apparatus to detect network traffic with spoofed source IP addresses.

SUMMARY OF THE INVENTION

Accordingly, disclosed is a method of detecting spoofed Internet Protocol (IP) traffic directed to a network having a plurality of autonomous systems (AS). The method comprises receiving an incoming packet through an AS, the incoming packet containing a source IP address and a destination IP address, acquiring corresponding source and destination IP address prefixes, converting the corresponding source and destination IP address prefixes into a source AS number and a destination AS number, determining if the incoming packet arrived from an unexpected source based upon the corresponding destination IP address prefix and the converted source and destination AS number using an unexpected pair tuple table generated from network routing information and generating an alert indicating that the incoming packet is not allowed to enter the network.

The unexpected tuple table is created by generating a list of all paths for each available IP prefix that do not traverse through a protected AS, each AS having a plurality of available IP prefixes, each available IP prefix defining a path, creating pairs of ASes along each path, each pair including an AS number for a destination AS and a source AS number for a source AS, the destination AS is a potential destination for traffic and the source AS is a potential source for traffic, appending a corresponding IP prefix from the destination AS to the source AS number and the destination AS number creating a preliminary unexpected tuple and generating a list of expected paths through the protected AS for each available IP prefix each AS having a plurality of available IP prefixes, each available IP prefix defining a path, creating pairs of ASes along each path, each pair including an AS number for a destination AS and a source AS number for a source AS, the destination AS is a potential destination for traffic and the source AS is a potential source for traffic, appending a corresponding IP prefix from the destination AS, to the source AS number and the destination number, creating an expected tuple. The expected tuple is compared with the preliminary unexpected tuple to remove the expected tuple from the preliminary unexpected tuple based upon the comparison. The remaining entries in the preliminary unexpected tuple are stored in the unexpected pair tuple.

Also disclosed is an anti-spoofing apparatus comprising processor having a program, when executing the program, the processor provides a mapping component which generates a mapping table indicating correlations between IP address prefixes and AS numbers by processing routing information from a plurality of data sources, tuple table generating component which generates a tuple table having at least one unexpected pair tuple, using publicly available connectivity information regarding routes between a plurality of autonomous systems for a given IP address prefix and a determining component configured to acquire a source and a destination IP prefix of an incoming operational traffic flow, convert the source and destination IP prefix into a source AS number and a destination AS number based on the mapping table and determine whether the incoming operational traffic flow is allowed to enter the network using the tuple table.

Also disclosed is a computer readable storage medium having a program of instructions which cause a computer to execute a method of detecting spoofed Internet Protocol (IP) traffic directed to a network having a plurality of autonomous systems (AS), comprising acquiring source and destination IP address prefixes from a source IP address and destination IP address, respectively, from a received incoming packet through an AS, converting the source and destination IP address prefixes into a source AS number and a destination AS number, determining if the incoming packet arrived from an unexpected source based upon the destination IP address prefix and the converted source and destination AS number using an unexpected pair tuple table generated from network routing information and generating an alert indicating that the incoming packet is not allowed to enter the network.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF THE INVENTION

Figure 1:
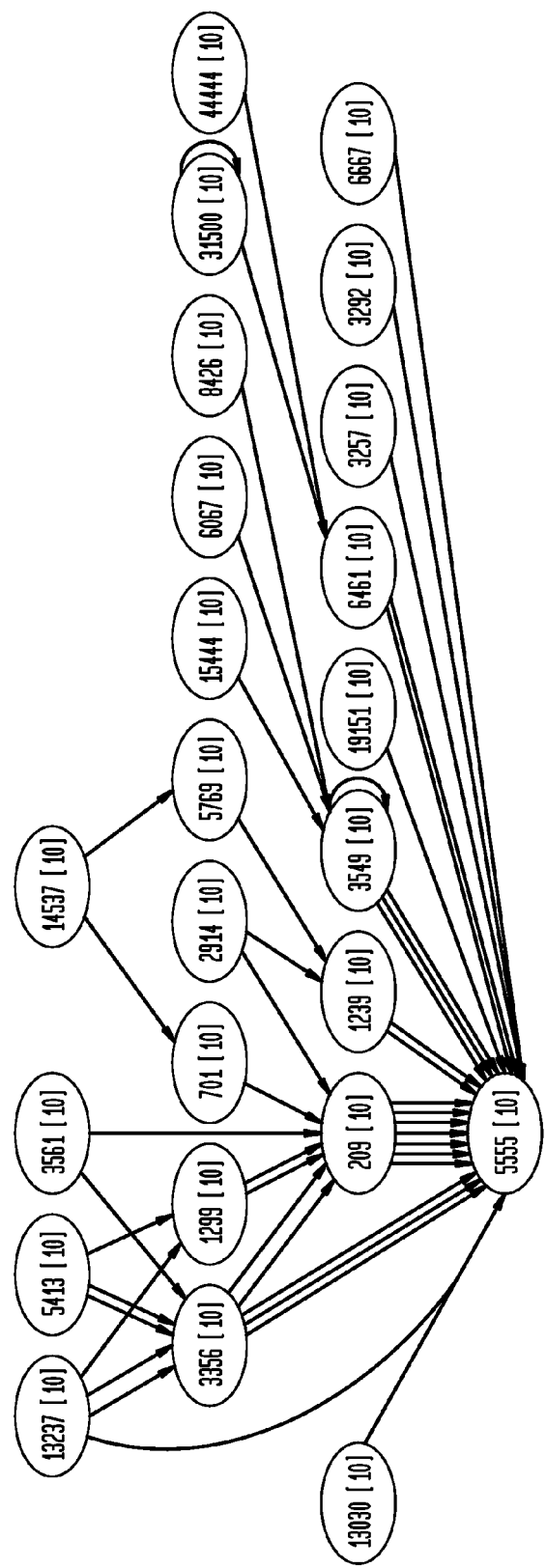
FIG. 1 illustrates an example of a network having a plurality of ASes, to which a method according to the present invention can be applied.

FIG. 1 depicts an exemplary network having a plurality of autonomous systems 10 (hereinafter "AS"). Each AS is referenced by an AS number. For purposes of the description, each individual AS will be referenced by it's AS number, such as AS 5555. An AS will be collectively referenced as "AS 10". The arrows between two ASes indicate an available or allowable connection between the ASes as specified by the routing protocol (or between itself, e.g., AS number 31500). The direction of the arrow pointer depicts the traffic direction. The connectivity information is provided by a publicly available source(s), such as, but not limited to, local Border Gateway Protocol (BGP) routers, RouteViews servers and IRR databases, respectively.

For instance an AS Path exists from AS 14537 to AS 5555 (where the numbers are the AS number) with intermediate ASes 701 and 209. This AS path can be represented as {14537, 701, 209, 5555}. In this case, 5555 is termed the destination AS and 14537 is the Source AS (from the perspective of the route). Based on the routing information from the publicly available sources, certain paths are not expected to be traversed. As depicted in FIG. 1, for instance, packets originating at AS 14537 and bound for AS 5555 should not be observed at AS 44444.

Therefore, an unexpected pair of ASes can be constructed from the perspective of an observation point. For example, the AS pair {14537, 5555}, represents an unexpected pair from the perspective of AS 44444. Thus, traffic originating from any IP prefixes in AS 14537 and destined to any prefixes in AS 5555 should not be seen or relayed through AS 44444.

Similarly, an expected path or expected pair can also be constructed from the information provided by the publicly available sources. For example, using the path {14537, 701, 209, 5555}, expected pair from AS 209's perspective is {14537, 5555} and {701, 5555}; i.e. the AS path also represents the best path between the intermediate ASes and the destination AS.

In the Internet, AS paths can vary depending on the destination prefix, based on operator's routing policies. For example, FIG. 1 shows two distinct AS Paths between AS 14537 and 5555, viz. {14537, 701, 209, 5555} and {14537, 5769, 1239, 5555}. For certain prefixes in the destination AS (5555) the former path is used, while the latter is used for other prefixes. Thus, while constructing expected and unexpected pairs, it is necessary to also take into the account the IP prefix advertised by the destination AS as well as the origin and source ASes.

Figure 2:
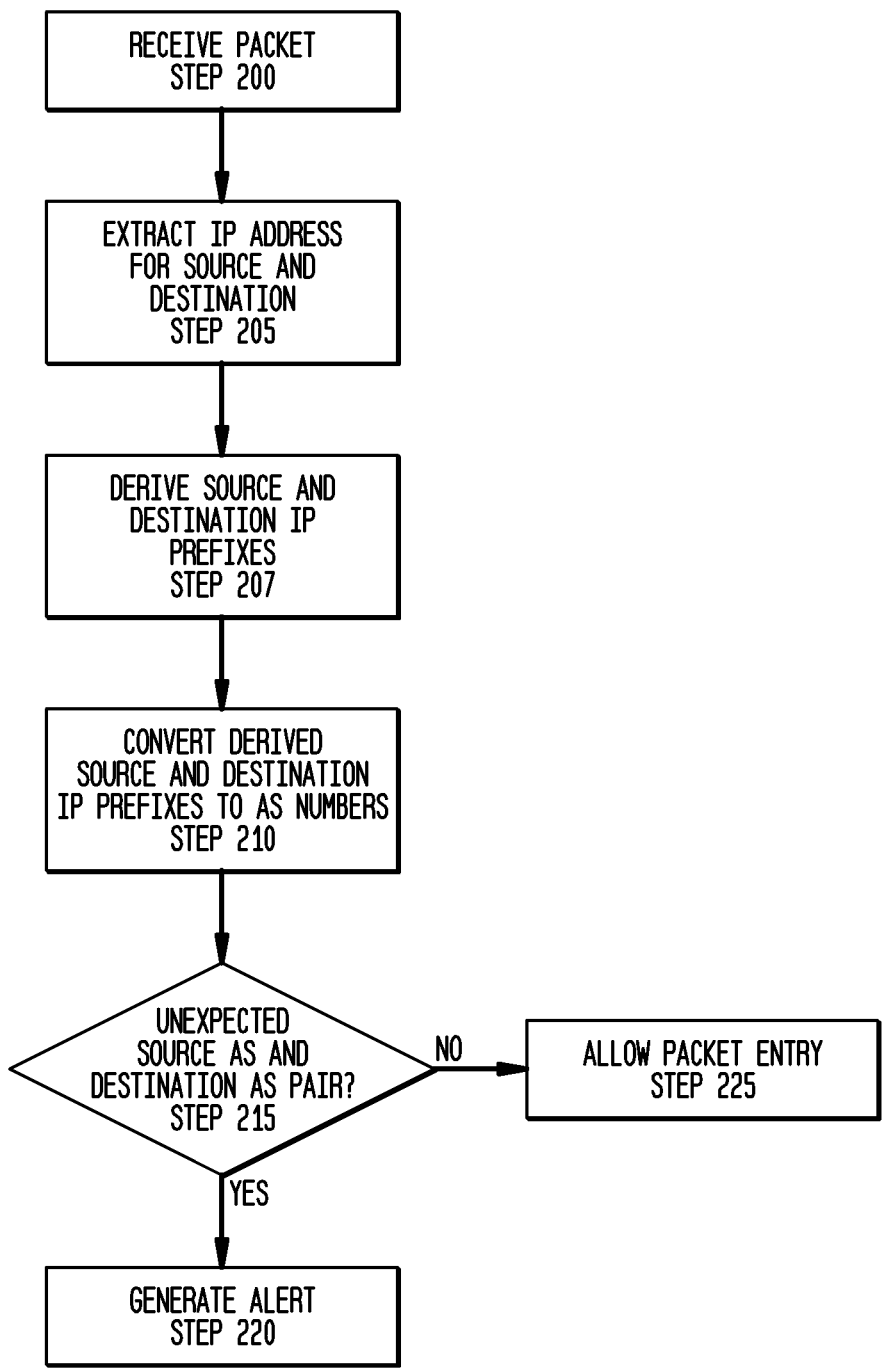
FIG. 2 is a flow chart illustrating a method for detecting spoofed IP traffic according to the invention.

FIG. 2 is an exemplary flow chart illustrating a method of detecting spoofed IP traffic. The method uses paths determined from publicly available routing data repositories that match the best paths used between a source and destination, e.g., AS paths as depicted in FIG. 1. The method can be used on network monitoring points within the core of a network or in an edge router. The method also distinguishes between paths of IP prefixes that belong to the same AS 10. The distinction is necessary in operational scenarios since different prefixes that belong to the same destination AS may be routed differently to the same destination AS. The method leverages the Internet routing topology in order to deduce information about infeasible routing paths and then applies this information to construct unexpected AS pair data. An advertised IP prefix for the destination is then added to unexpected AS pair to create an unexpected tuple. The tuples are stored in a Tuple Table. The spoofed IP traffic is detected by examining the incoming packet using the Tuple Table to determine if the packet includes an unexpected pair.

At step 200, the IP packet subject to examination is received at a protected AS. The addresses from an operational traffic flow are acquired. The IP packet includes a source IP address and a destination IP address. At step 205 the source IP and destination IP address is extracted from the packet. The method uses the IP prefixes. The IP prefixes are derived from the packet as step 207.

Figure 4:
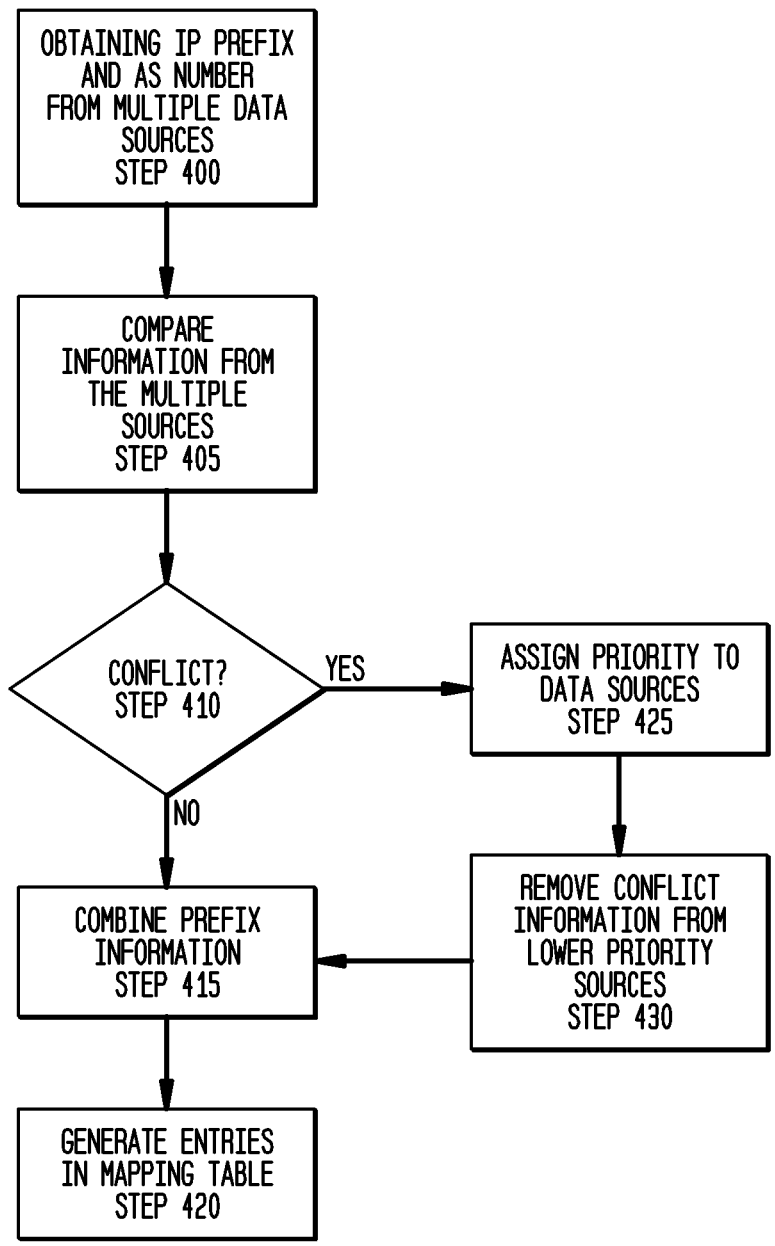
FIG. 4 is a flow chart illustrating a method for creating a mapping table indicating correlations between IP address prefixes and AS numbers according to the invention.

At step 210, the derived source and destination IP prefixes are converted into corresponding AS numbers based on a mapping table. The creation of the mapping table will be described in detail with respect to FIG. 4. The converted AS numbers for both the source and destination are compared with the AS numbers in each entry in the Tuple Table, i.e., unexpected pair tuples. The destination IP prefix is also used. The destination IP prefix is compared with the advertised IP prefix in the unexpected pair tuple. This comparison will be described in detail with respect to FIG. 5.

At decision step 215, it is determined whether there is a match between the converted AS number (source and destination) and the destination IP prefix and any of the unexpected tuples from the tuple table. If there is no match (N at step 215), the packet is allowed to enter the protected AS 10 (at step 225). If there is a match between the converted AS number (source and destination) and the destination IP prefix and any of the unexpected pair tuples ("Y" at step 215), an alert is generated, indicating that the operational traffic flow is not allowed to the network, at step 220.

FIG. 2 illustrates a method for detecting an IP packet spoofing where each protected AS is performing the method. However, the method can be implemented at a central location for all of the protected ASes. If the method is performed at a central location, the central location maintains a Tuple Table for each AS 10. The Tuple Table will be identified by AS number. If there is a match between the converted AS number (source and destination) and the destination IP prefix and any of the unexpected pair tuples from the Tuple Table ("Y" at step 215), the AS number associated with the Tuple Table is identified. Subsequently, AS number associated with the Tuple Table is compared to the number for the AS through which the traffic flow entered the network to determine if there is a match between the two AS numbers. If there is a match an alert is generated, indicating that the operational traffic flow not allowed into a specific AS. If there is no match, the traffic is allowed to enter the network through the specific interface.

Figure 3:
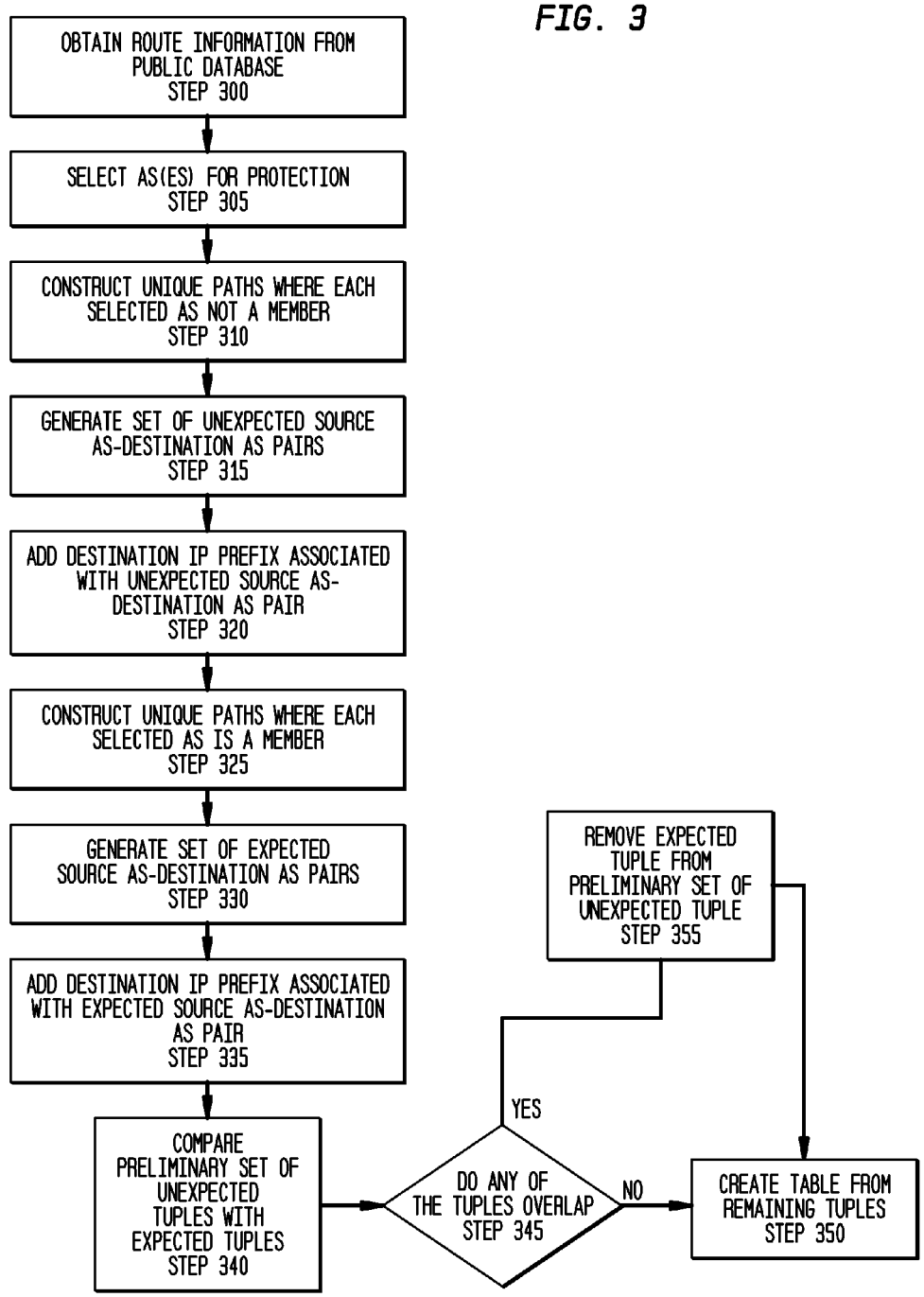
FIG. 3 is a flow chart illustrating a method for creating an unexpected Tuple Table based upon public routing information according to the invention.

FIG. 3 illustrates exemplary flow chart for creating a Tuple Table based upon public routing information. An unexpected pair tuple is represented as:

UEP={advertised IP prefix, Source AS, Destination AS}.

The UEP is generated from observation sources of BGP routing information such as the RouteViews data archives (http://www.routeviews.org/). At step 300, the route information is obtained from a public database, e.g., routeView. FIG. 1 illustrates an example of the routing information, i.e., connectivity between ASes.

At step 305, an AS 10 is selected for protection. In other words, the Tuple Table is constructed from a point of view of a protected AS. Unexpected pairs are then constructed from the perspective of a protected AS, which we refer to as ASo.

At step 310, all unique AS Paths ASPi, where ASo∉ASPi are generated for each available IP prefix. ASPi={AS1, AS2 . . . ASk . . . ASn} for Prefix Pi. For example, if the protected AS is 209 from FIG. 1, a unique path not having 209 as a member is (5769, 1239, 5555). Another example of a unique path not having 209 as a member is (15444, 3549, 5555). Traffic originating in ASes 5769 and 15444 and destined for AS 55555 is not expected in 209. It is also possible that one path is used for IP Prefix Pi and the other path is used for IP PrefixPb.

At step 315, the unexpected pairs are constructed for each prefix. AS Pairs from ASPi can be represented as:

{AS1, ASn}, {AS2, ASn}, . . . {Ask, ASn,} . . . {ASn−1, ASn}, where ASPi={AS1, AS2 . . . ASk . . . ASn} for Prefix Pi.

The unexpected pair is constructed from all available pairs of destination and source ASes along the path. For example, from FIG. 1, if the path is (5769, 1239, 5555) for IP Prefix Pi, then the unexpected pairs are {5769, 5555} and {1239, 5555}. If the path is (15444, 3569, 5555) for IP Prefix Pb, then the unexpected pairs are {15444, 5555} and {3459, 5555}.

At step 320, the IP prefix that corresponds to the generated path is added to the unexpected pair to form a preliminary unexpected pair tuple. For the above examples, the preliminary unexpected pair tuples would be:

{Pi, 5769, 5555} and {Pi, 1239, 5555} for Pi and
{Pb, 15444, 5555}, {Pb, 3459, 5555} for Pb.

The unexpected pairs and preliminary unexpected pair tuples are created for each path based upon the available IP prefixes for the destination AS in the pair.

Once the Unexpected Pair tuples are constructed, conflict resolution is performed on the unexpected pair tuples to eliminate tuples that may be expected to account for variations in observed Routing topologies from different vantage points in the Internet. For example, the routing information from the RouteView is constructed based upon different viewpoints and therefore, there can be inconsistencies between expected and unexpected sources or pairs.

At step 325, all unique AS Paths ASPi, where ASo∈ASPi are generated for each available IP prefixes.

ASPi={AS1, AS2 . . . ASk, ASo, ASk+1 . . . ASn} for Prefix Pa from the point of view of the protected AS, e.g., 209. For example, from FIG. 1, a unique path having 209 as a member is (13237, 3356, 209, 5555). Another example of a unique path having 209 as a member is (13237, 1299, 209, 5555). Traffic originating at AS 13237 and destined for AS 5555 would be expected at AS 209.

At step 330, the expected pairs are constructed for each IP Prefix. AS Pairs from ASPi can be represented as:

{AS1, ASn}, {AS2, ASn}, . . . {Ask, ASn}, {ASo, ASn} . . . {ASn−1, ASn}, where ASPi={AS1, AS2 . . . ASk, ASo, ASk+1 . . . ASn} for IP Prefix Pa.

For example, from FIG. 1, if the path is (13237, 3356, 209, 5555) for IP Prefix Pi, then if the protected AS was AS 209, the expected pairs would be {13237, 5555}, {3356, 5555} for Prefix Pa.

At step 335, the IP prefix that corresponds to the generated path is added to the expected pair to form the expected pair tuple. For the above example, the expected AS pair tuples would be:

{Pa, 13237, 5555}, {Pa, 3356, 5555} for IP Prefix Pa.

Once the expected AS pair tuples are constructed, they are matched against elements in the preliminary unexpected pair tuples at step 340 to determine of any of the tuples overlap. If there is an overlap ("Y" at decision step 345), any overlapping tuples are removed from the preliminary unexpected pair tuples to form the unexpected pair tuples at step 355. If there is no match, ("N" at decision step 345), the unexpected pair tuples are the same as the preliminary unexpected tuple. At step 350, the Tuple Table is created from all unexpected pair tuples remaining. Steps 310-350 are performed for each AS selected for protection.

As described above, the source and destination IP prefixes are converted into AS numbers using a mapping table. The mapping table is created from mapping BGP route information pertaining to specific source prefixes. The BGP route information can be collected locally from the network operator's routers, from RouteViews servers, and/or from IRR databases. IRR databases contain authoritative information on the mapping of registered IP prefixes to their corresponding AS assignments. However, the mapping of an IP address prefix to an AS may not be one to one. For example, one IP address prefix can be registered with several AS numbers. It is up to a registrant to establish which AS numbers match which subsets of the prefix. Furthermore, a registered IP address prefix does not necessarily indicate that the specific prefix is used in the registered network. In addition, every IP address prefix is not necessarily registered with a given set of IRR databases.

Typically, RouteViews servers contain live BGP routing data that represents the actual information used by routers in the Internet to forward traffic. This data can also be used to infer a corresponding AS number for a given IP address prefix. However, RouteViews data from a given set of servers may not contain information about a given IP address prefix since the prefix may not be visible at these servers.

Further, due to misconfiguration, it is even possible that some of the IP Prefix to AS number mappings may be incorrect. Typically, a network operator's local BGP routers are subject to similar constraints as RouteViews servers and, therefore, cannot be considered authoritative sources of IP address prefix to AS number mappings.

Considering the deficiencies in the BGP routing information from each of the data sources discussed above (RouteViews, IRR & local BGP servers), FIG. 4 illustrates an exemplary method for generating the mapping table. The disclosed method using route/routing information from a plurality of sources, performs conflict resolution and merges information from the plurality of sources based upon a priority. For some IP prefixes, the data sources may be complementary while in case of others, they may be conflicting.

At step 400, BGP routing information is collected from the local BGP routers, RouteViews servers and IRR databases, respectively. At step 405, a comparison is made between the routing information from each of the sources to determine if a conflict exists between the respective routing data acquired from the local BGP routers, RouteViews servers and IRR databases. If the respective BGP routing data from the difference data sources are not in conflict ("N" at decision step 410), at step 415, the various BGP routing data are combined or merged. Subsequently, at step 420, the processed information is used to create the mapping table indicating correlations between IP address prefixes and AS numbers.

However, if there is a conflict between the BGP routing data from the different data sources ("Y" at decision step 410), a priority is assigned to each data source containing conflicting routing data, at step 425. Subsequently, the conflicting routing data from the data source having a relatively lower priority is removed from the routing data at step 430. The remaining data is available for further processing at step 415, e.g., combined with routing data from other data sources not containing conflicting routing data. Subsequently, at the step 420, the processed information is used to create the mapping table indicating correspondences between IP address prefixes and AS numbers.

Alternatively, the entire set of routing data from the source having the relatively lower priority can be ignored and the routing data from the sources have the relatively higher priority is used, e.g., combined with routing data from other data sources not containing conflicting routing data.

Conflicts are resolved by assigning higher trust levels to some subset of sources. Thus, if an IRR database and a RouteViews server contain conflicting AS information about the same IP Prefix, the information from the IRR database may be given preference by assigning the IRR database a relatively higher trust level, i.e., assigning a relatively lower trust level to the RouteViews servers. The conflict resolution steps (405-430) are repeated until all of the conflicts are resolved.

After the mapping table and the Tuple Table is populated with the IP Address Prefixes/AS number mapping and the route/routing information, respectively, the system or apparatus can detect a spoofed IP packet.

Figure 5:
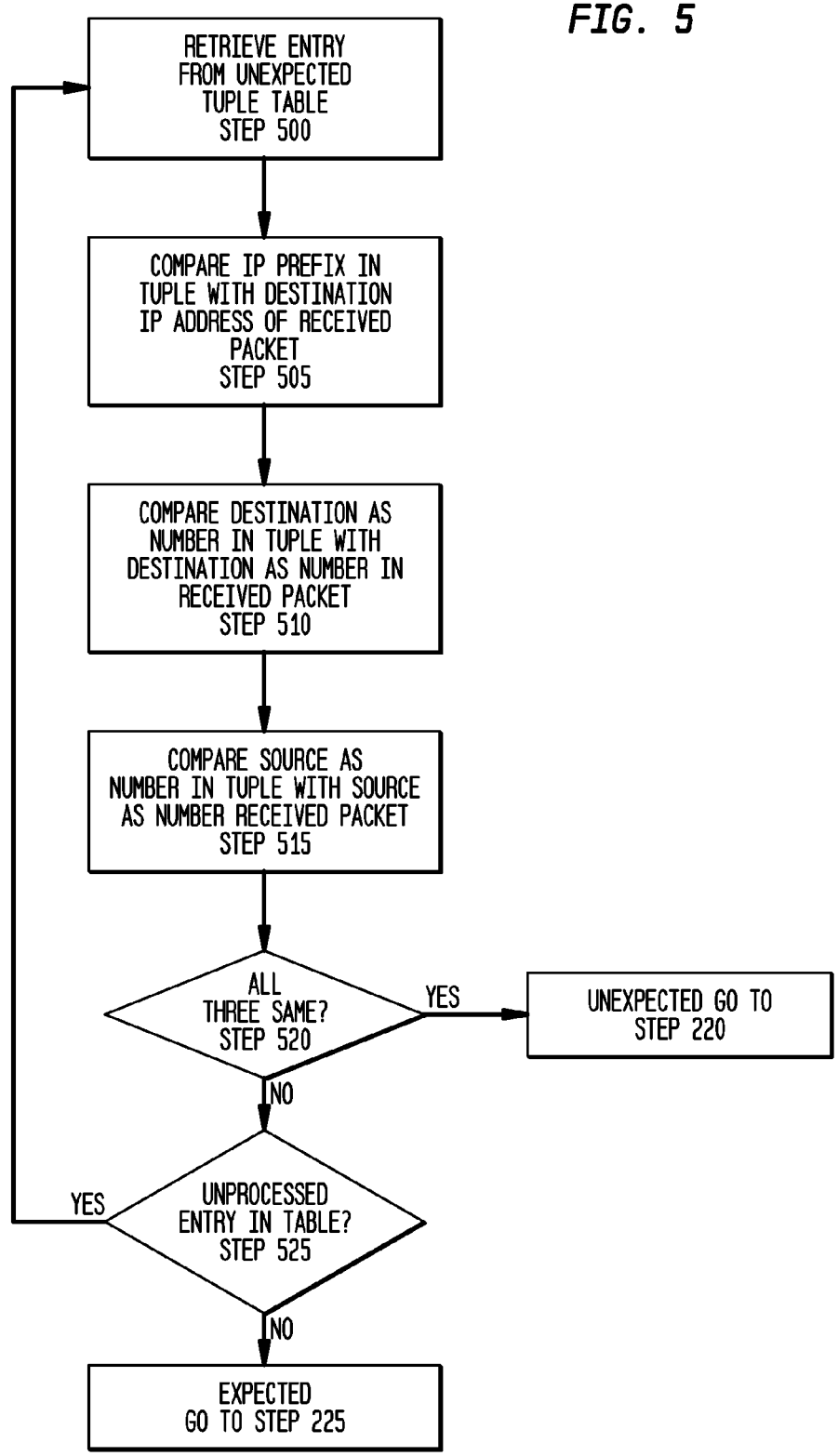
FIG. 5 is a flow chart illustrating comparing information from the received packet with tuples in the unexpected Tuple Table according to the invention.

IP packets traversing a protected AS (e.g., ASo) are analyzed for the presence of an unexpected pairs tuple. FIG. 5 is an exemplary flow chart illustrating the comparison information from the received packet with tuples in the Tuple Table. In order to compare IP packets against this set of information, the packet's source and destination IP addresses need to be translated to the source and destination AS numbers respectively using the mapping table.

At step 500, an UEP tuple is retrieved from the Tuple Table, e.g., the first unexpected pair tuple. The destination IP address in the received packet is matched against the IP Prefix in the UEP tuple at step 505. The converted destination AS number from the IP packet is compared with the destination AS number in the UEP tuple at step 510.

The converted source AS number from the IP packet is compared with the source AS number in the UEP tuple at step 515. A match for all three comparisons indicates that an unexpected packet was observed at this observation point, indicating with a high probability that the source address of the observed packet was spoofed. If a match for all three comparison occurs ("Y" at decision step 520), the method proceeds to step 220 and an alert is generated. If no match for all three comparisons ("N at decision step 520), a determination is made if there is another UEP tuple in the Tuple Table at decision step 525. If there are no more UEPs in the Tuple Table, then the IP packet was expected at the protected AS and therefore is allowed to proceed into the AS 10, e.g. process moves to step 225.

If there is another UEP tuple in the Tuple Table, the next UEP tuple in the Tuple Table is retrieved, i.e., process returns to step 500. Steps 500-525 are repeated until all UEP tuples in the Tuple Table are compared with the information in the received IP packet ("N" at decision step 525) or until there is a match for all three comparisons ("Y" at decision step 520).

Figure 6:
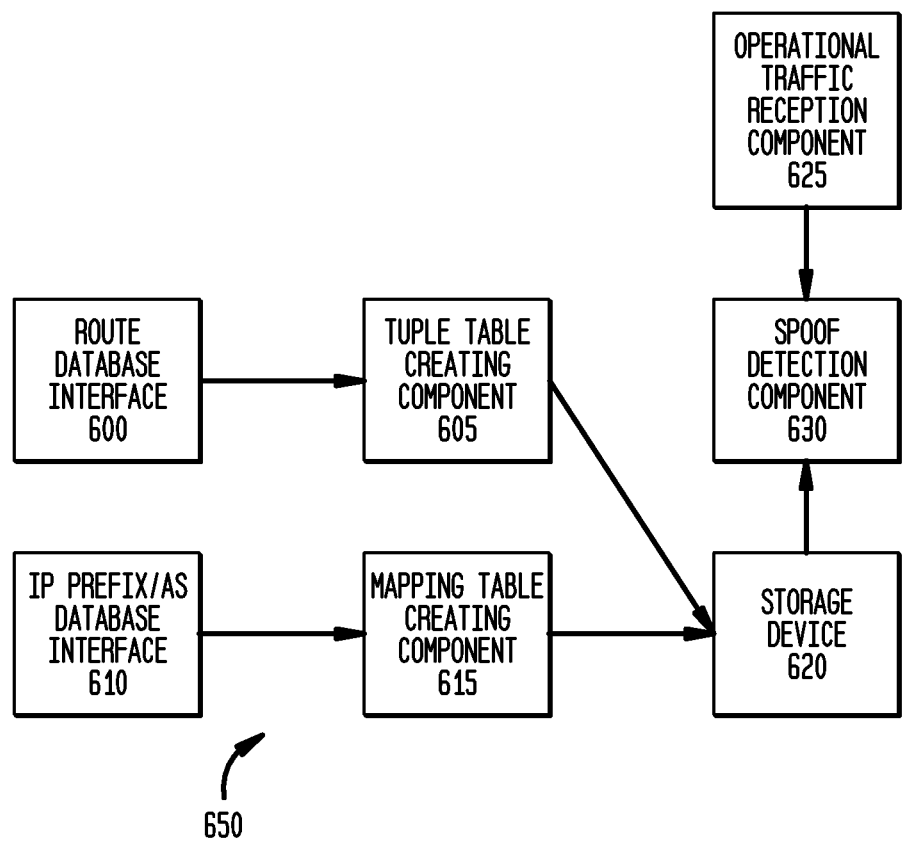
FIG. 6 is a block diagram of an anti-spoofing apparatus according to the invention.

FIG. 6 is a block diagram illustrating an exemplary anti-spoofing apparatus 650 according to the present invention. The apparatus 650 can be employed to detect spoofed IP traffic directed to a network having a plurality of interfaces, e.g., ASes 10. The apparatus can be located within a protected AS or a central location managing a plurality of ASes. The apparatus 650 can prevent attack traffic flow from entering the network by referring to a dynamically generated Tuple Table and a mapping table to confirm that an IP packet is not coming from an unexpected source. A spoofed traffic flow is determined by comparing destination IP prefix and the source and destination AS numbers with UEP tuples in a Tuple Table.

The anti-spoofing apparatus 650 includes a route data interface 600 and an IP prefix/AS Database Interface 610. The route data interface 600 is configured to retrieve and receive route information, e.g., connectivity information, from one or more publicly available sources of route information, such as RouteViews. The IP prefix/AS Database Interface 610 is configured to retrieve and receive mapping information, e.g., available IP prefixes and ASes numbers from a plurality of publicly available sources. Although, depicted in FIG. 6 as separate interfaces, the route data interface 600 and the IP prefix/AS Database Interface 610 can be one interface. The interfaces 600 and 610 can be a transmitter/receiver unit controlled by a processor. Coupled to the route data interface 600 is a Tuple Table Creating Component 605. The Tuple Table Creating Component 605 is configured to execute the steps and functionality described herein for creating the Tuple Table. For example, the Tuple Table Creating Component 605 can be a processor programmed with a program for performing the steps and functionality described herein for creating the Tuple Table. The Tuple Table Creating Component generates the preliminary unexpected pair tuples from the route/routing information received from the publicly available sources via the route database interface 600, generates the expected pair tuples from the same information, compares the two sets of tuples for conflicts and removes the overlapping tuples to create the final UEP tuple.

Coupled to the IP prefix/AS Database Interface 610 is a Mapping Table Creating Component 615. The Mapping Table Creating Component 615 is configured to execute the steps and functionality described herein for creating the mapping table. For example, the Mapping Table Creating Component 615 can be a processor programmed with a program for performing the steps and functionality described herein for creating the mapping table. The Mapping Table Creating Component 615 receives and processes routing information originated from a plurality of publicly available sources via the IP prefix/AS Database Interface 610, to generate a mapping table indicating correlations between IP address prefixes and AS numbers. The mapping table can be stored in a storage device 620.

The storage device 620 is configured to store the mapping table, the Tuple Table and any alerts generated by the Spoof Detection Component 630. The storage device 620 can be, but is not limited to, a magnetic storage device, a random access memory (RAM), a read-only memory (ROM), an erasable programmable read-only memory (EPROM or Flash memory), and an optical storage device.

The Spoof Detection Component 630 is coupled to the storage device 620 and an Operational Traffic Reception Component 625. The Spoof Detection Component 630 is configured to execute the steps and functionality described herein for detecting spoofed IP traffic. For example, the Spoof Detection Component 630 can be a processor programmed with a program for performing the steps and functionality described herein for detecting spoofed IP traffic.

The Spoof Detection Component 630 acquires the IP addresses of an incoming operational traffic flow, and converts them into source and destination AS numbers based on the mapping table generated by the Mapping Table Creating Component 615. The Spoof Detection Component 630 further determines whether the incoming operation traffic flow is allowed to enter the network. For example, the Spoof Detection Component 630 can include a comparing component (not shown), which compares the converted source and destination AS numbers with the source and destination AS numbers in an UEP tuple from the Tuple Table stored in the storage device 620 generated by the Tuple Table Creating Component 605 and compares the destination IP address with the IP prefix in the UEP tuple. If there is match for all three comparisons, the Spoof Detection Component 630 can generate an alert notification, which can be stored in a storage device 620.

While the Tuple Table Creating Component 605, the Mapping Table Creating Component 615, and the Spoof Detection Component 630 have been illustrated as separate component, these components can be combined into one device, such as a processor.

The Operational Traffic Reception Component is configured to receive IP traffic.

As described herein, the Tuple Table and mapping table are created by the respective sections. These tables can be periodically updated to reflect the current network topology and connectivity. The update period can be adjustable based upon certain adjustment criterion such as, but not limited to, network congestion, bandwidth, and number of alerts generated for a predetermined time.

As will be appreciated by one skilled in the art, the present invention may be embodied as an apparatus, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as "routers", "AS", "modules", "components" or "interfaces".

Various aspects of the present invention may be embodied as a program, software, or computer instructions embodied or stored in a computer or machine usable or readable medium, which causes the computer or machine to perform the steps of the method when executed on the computer, processor, and/or machine. A computer readable medium, tangibly embodying a program of instructions executable by the machine to perform various functionalities and methods described in the present invention is also provided.

The apparatus and method of the present disclosure may be implemented and run on a general-purpose computer or special-purpose computer system. The computer system may be any type of known or will be known systems such as, but not limited to, a virtual computer system and may typically include a processor, memory device, a storage device, input/output devices, internal buses, and/or a communications interface for communicating with other computer systems in conjunction with communication hardware and software, etc.

The computer readable medium could be a computer readable storage medium or a computer readable signal medium. Regarding a computer readable storage medium, it may be, for example, a magnetic, optical, electronic, electromagnetic, infrared, or semiconductor system, apparatus, or device, or any suitable combination of the foregoing; however, the computer readable storage medium is not limited to these examples. Additional particular examples of the computer readable storage medium can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an electrical connection having one or more wires, an optical fiber, an optical storage device, or any appropriate combination of the foregoing; however, the computer readable storage medium is also not limited to these examples. Any tangible medium that can contain, or store a program for use by or in connection with an instruction execution system, apparatus, or device could be a computer readable storage medium.

The terms "AS" and "network" as may be used in the present disclosure may include a variety of combinations of fixed and/or portable computer hardware, software, peripherals, and storage devices. The apparatus may include a plurality of individual components that are networked or otherwise linked to perform collaboratively, or may include one or more stand-alone components.

The hardware and software components of a computer system of the present disclosure may include and may be included within fixed and portable devices such as desktop, laptop, and/or server, and network of servers (cloud). A "component" may be a portion of a device, software, program, or system that implements some "functionality", which can be embodied as software, hardware, firmware, electronic circuitry, or etc.

The above description provides illustrative examples and it should not be construed that the present invention is limited to these particular example. Thus, various changes and modifications may be effected by one skilled in the art without departing from the spirit or scope of the invention as defined in the appended claims.

What is claimed is:

1. A method of detecting spoofed Internet Protocol (IP) traffic directed to a network having a plurality of autonomous systems (AS), comprising:
said network:
receiving an incoming packet through an AS, the incoming packet containing a source IP address and a destination IP address;
acquiring a corresponding source and destination IP address prefixes from the source IP address and destination IP address, respectively;
converting the corresponding source and destination IP address prefixes into a source AS number and a destination AS number;
determining if the incoming packet arrived from an unexpected source based upon the corresponding destination IP address prefix and the converted source and destination AS number using an unexpected pair tuple table generated from network routing information;
generating an alert indicating that the incoming packet is not allowed to enter the network;
generating the unexpected pair tuple table;

generating a list of all paths for each available IP prefix that do not traverse through a protected AS, each AS having a plurality of available IP prefixes, each available IP prefix defining a path;

creating pairs of ASes along each path, each pair including an AS number for a destination AS and a source AS number for a source AS, the destination AS is a potential destination for traffic and the source AS is a potential source for traffic;

appending a corresponding IP prefix from the destination AS to the source AS number and the destination AS number creating a preliminary unexpected tuple;

generating a list of expected paths through the protected AS for each available IP prefix each AS having a plurality of available IP prefixes, each available IP prefix defining a path;

creating pairs of ASes along each path, each pair including an AS number for a destination AS and a source AS number for a source AS, the destination AS is a potential destination for traffic and the source AS is a potential source for traffic;

appending a corresponding IP prefix from the destination AS, to the source AS number and the destination number, creating an expected tuple;

comparing the expected tuple with the preliminary unexpected tuple; and removing the expected tuple from the preliminary unexpected tuple based upon the comparison, wherein remaining entries in the preliminary unexpected tuple are stored in the unexpected pair tuple.

2. The method of detecting spoofed Internet Protocol (IP) traffic according to claim 1, wherein the unexpected pair tuple table contains entries of unexpected sources.

3. The method of detecting spoofed Internet Protocol (IP) traffic according to claim 1, wherein the unexpected pair tuple table includes an advertised IP prefix for an AS, an AS number for a destination AS and a source AS number for a source AS, the destination AS is a potential destination for traffic and the source AS is a potential source for traffic.

4. The method of detecting spoofed Internet Protocol (IP) traffic according to claim 3, wherein determining comprises:
comparing a destination IP address in the incoming packet with an advertised IP prefix for an AS for each unexpected pair tuple in the unexpected pair tuple table;
comparing the converted source AS number with the source AS number for a source AS for each unexpected pair tuple in the unexpected pair tuple table; and
comparing the converted destination AS number with the destination AS number for a destination AS for each unexpected pair tuple in the unexpected pair tuple table, wherein if all three match, the alert is generated.

5. The method of detecting spoofed Internet Protocol (IP) traffic according to claim 1, wherein the network routing information is information from a border gateway protocol and is based upon available routing paths between ASes.

6. The method of detecting spoofed Internet Protocol (IP) traffic according to claim 1, wherein the converting is based upon a mapping table.

7. The method of detecting spoofed Internet Protocol (IP) traffic according to claim 6, further comprising:
creating the mapping table indicating correlations between IP address prefixes and AS numbers by using information from a plurality of data sources.

8. The method of detecting spoofed Internet Protocol (IP) traffic according to claim 7, further comprising:
determining if there is a conflict between information from the plurality of data sources.

9. The method of detecting spoofed Internet Protocol (IP) traffic according to claim 8, wherein
if there is no conflict between the information from the plurality of data sources, combining the information from the data sources; and
if there is a conflict between the information from the plurality of data sources, each of the plurality of data sources is assigning a priority, and the mapping table is created using the information from the data source of the plurality of data sources having a higher priority.

10. The method of detecting spoofed Internet Protocol (IP) traffic according to claim 6, further comprising:
updating periodically the mapping table using the information from the plurality of data sources.

11. The method of detecting spoofed Internet Protocol (IP) traffic according to claim 1, further comprising:
updating periodically the unexpected pair tuple table using network routing information.

12. A non-transitory computer readable storage medium having a program of instructions which cause a computer to execute a method of detecting spoofed Internet Protocol (IP) traffic directed to a network having a plurality of autonomous systems (AS), comprising
acquiring source and destination IP address prefixes from a source IP address and destination IP address, respectively, from a received incoming packet through an AS;
converting the source and destination IP address prefixes into a source AS number and a destination AS number;
determining if the incoming packet arrived from an unexpected source based upon the destination IP address prefix and the converted source and destination AS number using an unexpected pair tuple table generated from network routing information;
generating an alert indicating that the incoming packet is not allowed to enter the network;
generating the unexpected pair tuple table;
generating a list of all paths for each available IP prefix that do not traverse through a protected AS, each AS having a plurality of available IP prefixes, each available IP prefix defining a path;
creating pairs of ASes along each path, each pair including an AS number for a destination AS and a source AS number for a source AS, the destination AS is a potential destination for traffic and the source AS is a potential source for traffic;
appending a corresponding IP prefix from the destination AS to the source AS number and the destination AS number creating a preliminary unexpected tuple;
generating a list of expected paths through the protected AS for each available IP prefix each AS having a plurality of available IP prefixes, each available IP prefix defining a path;
creating pairs of ASes along each path, each pair including an AS number for a destination AS and a source AS number for a source AS, the destination AS is a potential destination for traffic and the source AS is a potential source for traffic;
appending a corresponding IP prefix from the destination AS, to the source AS number and the destination number, creating an expected tuple;
comparing the expected tuple with the preliminary unexpected tuple; and
removing the expected tuple from the preliminary unexpected tuple based upon the comparison, wherein remaining entries in the preliminary unexpected tuple are stored in the unexpected pair tuple.

* * * * *

UNITED STATES PATENT AND TRADEMARK OFFICE
CERTIFICATE OF CORRECTION

| | | |
|---|---|---|
| PATENT NO. | : 8,925,079 B2 | Page 1 of 1 |
| APPLICATION NO. | : 13/295553 | |
| DATED | : December 30, 2014 | |
| INVENTOR(S) | : Vaidyanathan et al. | |

It is certified that error appears in the above-identified patent and that said Letters Patent is hereby corrected as shown below:

Specification

In Column 3, Line 35, delete "it's" and insert -- its --, therefor.

Signed and Sealed this
Seventeenth Day of November, 2015

Michelle K. Lee
*Director of the United States Patent and Trademark Office*